Jan. 1, 1929. B. H. LENGSFIELD Re. 17,177

GARMENT CARTON

Original Filed March 2, 1927

Inventor
Byron H. Lengsfield

By Mason Fenwick & Lawrence,
Attorneys

Reissued Jan. 1, 1929. Re. 17,177

UNITED STATES PATENT OFFICE.

BYRON HASSBERG LENGSFIELD, OF NEW ORLEANS, LOUISIANA, ASSIGNOR TO LENGSFIELD BROTHERS, OF NEW ORLEANS, LOUISIANA.

GARMENT CARTON.

Original No. 1,661,484, dated March 6, 1928, Serial No. 172,159, filed March 2, 1927. Application for reissue filed November 9, 1928. Serial No. 318,291.

This invention relates to improvements in garment cartons, particularly adapted for receiving a coat and trousers in such a manner as to be convenient for parcel post special handling and delivery.

An object of this invention is to provide a parcel post special handling package adapted for use as a combination suit, cloak or dress box, being made in one piece, having a combination hanger and folder integrally connected thereto.

Other objects of this invention will appear from the following detailed description of the device and as disclosed in the single sheet of drawings herewith made a part of this application.

In the drawings:

Fig. 1 discloses a perspective view of the main body portion of the carton showing garment elements in partly folded position therein.

Figure 1:
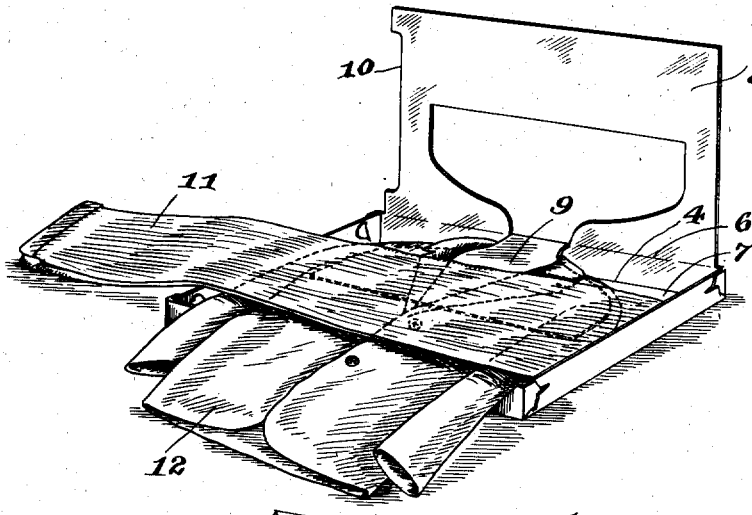
Figure 2:
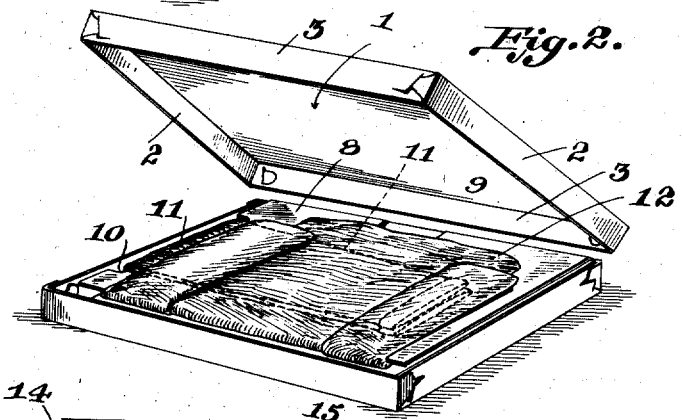
Fig. 2 illustrates a perspective view of the carton showing the cover portion in raised relationship to the main body portion and garment elements in folded position within the main body portion.
Figure 3:
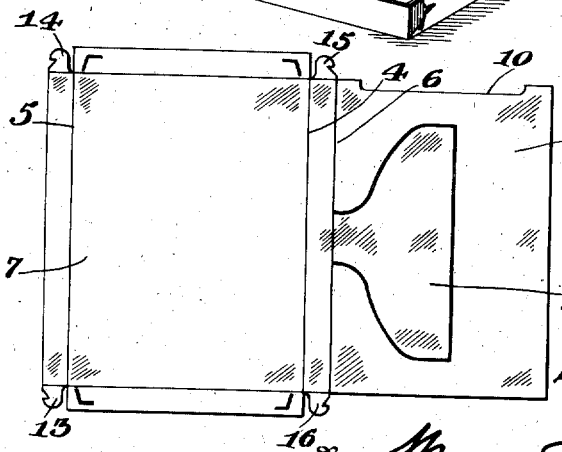
Fig. 3 represents a plan view of the main portion of the carton as formed from a single piece of suitable material previous to folding into a carton receptacle.

The carton for receiving folded garments in this invention is preferably formed having a detachable cover portion 1 made from a single piece of material and having suitably interlocked end and side edges 2 and 3. The main body portion of the container or carton is preferably made from a blank having scored lines 4, 5 and 6 for providing two approximately equal sections 7 and 8, the section 7 adapted to form the bottom of the main portion of the container, while section 8 is provided with a suitably formed flap portion 9 adapted as a hanger for coat element 12 of a garment, the flap 9 being integrally formed from the portion 8 of the container, and a notched portion 10 along one edge of the foldable portion 8 of the container for the purpose of receiving the trouser element 11 of the garment when folded into position within the container.

The main portion of the carton may be brought into assembled and folded relationship by means of suitable interlocking elements 13, 14, 15 and 16 arranged at the corners in the ordinary manner, scored lines 4, 5 and 6 functioning to provide easily foldable means at the desired locations.

In operation, this invention provides a convenient and efficient parcel post special handling case or carton adapted to hold a garment of a suitable type, such as a combination suit, cloak or dress, made in one piece, with the combination hanger and folder attached thereto. The device herewith described and claimed will handle successfully suits, dresses, cloaks and other wearing apparel in such a manner as to prevent the article of clothing from becoming mussed or out of shape through handling in delivery or otherwise.

The main body portion of the container or carton is constructed or formed in the shape of a box by means of the ordinary expediency, such as a regular lock corner element as shown at 13, 14, 15 and 16, with the hanger or support 9 integrally and foldably a part of the container.

In operation, the suit of clothing, for instance, comprising a trouser element 11 and a coat portion 12, may be placed within the carton as follows: The flap 9 is adapted to act as a hanger over which the coat is first hung, and placed in the box the full length as distinctly disclosed in Figure 1, with the element 8 raised to allow the coat to be fitted under the portion 8, after which the coat is folded full length as disclosed in Figure 1, leaving one half of the coat overlapping outside of the box. The trousers are then placed lengthwise in the box with the upper portion lying flat on the coat, as also disclosed in Figure 1. The element 8 is then folded down over the trousers and the upper portion of the coat, the remaining lower half of the trousers is then folded over the portion 8 within the notched element 10 which is cut out to allow for the fold of the trousers, the remaining half of the coat is then folded over the element 8 and the trousers 11.

This arrangement provides successive interlocking folds, causing the suit to remain firmly in place, and making it impossible for the suit to slip or slide or become mussed with the roughest handling after the cover portion 1 has been placed thereon, thereby allowing the dealers to deliver the suit or all classes of wearing apparel in first-class condition.

What I claim is:—

1. A carton for holding garment elements comprising a detachable cover portion, a main body portion having foldable sections, foldable side and end walls for one of the sections adapted to be suitably interlocked at their corners, thereby forming a container of a suitable depth for receiving the garment elements in folded relationship, a supporting section foldable along one edge of a side wall, a garment hanger flap portion formed from the supporting section, thereby providing means for securely locking the garment in the container and preventing wrinkling through rough handling, a notched portion along one edge of the supporting section for receiving a garment element thereby providing a main body portion for bringing the garment elements into interlocked relationship when folded within the main body portion.

2. A garment holding carton including a one-piece box comprising a main body portion having foldable side and end walls integral therewith and provided with cooperating means for interlocking the adjacent ends of said walls at the corners of said body portion, a garment supporting section integral with one of said walls and foldable about the edge thereof into the space between the remaining walls, and a garment hanger flap formed from said section and pivotable about said edge into said space independently of said section.

3. A garment holding carton including a one-piece box comprising a main body portion having foldable side and end walls integral therewith and provided with cooperating means for interlocking the adjacent ends of said walls at the corners of said body portion, a garment supporting section integral with one of said walls and foldable about the edge thereof into the space between the remaining walls, a garment hanger flap formed from said section and pivotable about said edge into said space independently of said section, and a detachable cover slidable snugly over said walls only when the said section and flap are folded into said space.

4. A one-piece garment holding box having a bottom, side, and end walls, a section of substantially the same area as the space between said walls and integral with and pivoted to the edge of one of said walls to move into and out of said space, and a garment holding flap formed from said section and pivotable about said edge into said space independently of said section.

5. A one-piece garment holding box having a bottom, side, and end walls, a section of substantially the same area as the space between said walls and integral with and pivoted to the edge of one of said walls to move into and out of said space, a garment holding flap formed from said section and pivotable about said edge into said space independently of said section, and a cover slidable snugly over said walls only when the section and flap are disposed in said space.

In testimony whereof I have signed my name to the specification.

BYRON HASSBERG LENGSFIELD.